3,137,678
POLYMERIZED MALEIC IMIDE AND METHODS OF MAKING IT
Paule Jousset, born Viel, Paris, France, assignor to Compagnie de Saint-Gobain, Neuilly-sur-Seine, France
No Drawing. Filed Oct. 6, 1960, Ser. No. 60,774
Claims priority, application France Oct. 29, 1959
9 Claims. (Cl. 260—78)

This invention relates to polymerized maleic imide and to methods of making it. Maleic imide has the formula:

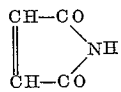

It is known that it can be copolymerized by heat in the presence of catalysts such as benzoyl peroxide with unsaturated compounds, such as vinyl acetate, vinyl ethyl-ether, butadiene, chloroprene, and bis (allyl carbonate) of diethyleneglycol, in mass or in aqueous emulsion to yield resinous products of properties varying with the added monomer, but maleic imide has not heretofore been polymerized alone.

It is an object of this invention to make polymerized maleic imide and to find a use for it. Another object is to catalyze the reaction and to supply catalysts for it. Another object is to prepare it by a novel and efficient process. Another object is to make variants of different molecular weight and modified properties.

The objects are accomplished generally speaking by dissolving maleic imide in a saturated aliphatic alcohol of low molecular weight and polymerizing it with the aid of a catalyst, such as benzoyl peroxide and diazodiisobutyro-nitrile, capable of supplying free radicals.

The polymer is insoluble in the solvent in which the monomer is dissolved and precipitates as it forms. It can be separated by filtration, washing, and drying, or by evaporation of the volatile solvents. In practice the polymerization can be carried out in methanol, ethanol, propanol, and in alcohols having 4 or 5 C atoms in the alkyl radical. I have discovered that the lower the molecular weight of the solvent the higher the molecular weight of the polymer, so that methanol is the preferred solvent for the production of polymers of high molecular weight and will ordinarily be the choice of the worker in the art.

The catalysts work efficiently when present in about 0.5 to 2% of the weight of the monomer. It is advisable to heat the reaction mass to a moderate temperature and to sustain the heating until the polymer precipitates. Optimum results are secured at temperatures between 40 and 75° C.

The higher polymers thus produced are insoluble in water and many organic solvents, e.g., acetone and dioxane. They resist concentrated $H_2SO_4$ but dissolve in it without decomposition or loss of molecular weight. They are exceptionally resistant to heat. They sustain temperatures about 300° C. practically without decomposition.

The polymers of maleic imide are thermoplastic and can be shaped by heat and pressure in the molds and extrusion machinery ordinarily employed on other thermoplastics. Fritting, molding, and extrusion are satisfactorily employable in making articles from the new materials. Objects made from the novel polymers by heating to plasticity under pressure have good electrical resistance and are useful as insulators.

EXAMPLES

In the following tables are stated the conditions used in making various polymers of maleic imide, using the following general technique:

Maleic imide is dissolved in an alcohol contained in a glass tube, one adds the catalyst, evacuates air from the tube, and seals the tube, for instance by flame. The sealed tube is placed in a water bath maintained under moderate and sustained heat, e.g., 60° C.

A mist appears rapidly in the solution and precipitation of the polymer follows. When the precipitation ends the tube is removed from the bath, opened and the product is isolated and dried. It may then be washed in methanol and ether and dried in an oven at 110° C. Analysis by infra-red spectrography shows it to be poly maleic imide. It is a white powder. When placed on a surface heated to 300° C. it does not melt or decompose and does not turn yellow. Its molecular weight is determinable by intrinsic viscosity, which is in turn derived from the specific viscosity of 1%, 0.5% and 0.25% solutions in concentrated $H_2SO_4$. An intrinsic viscosity of 225 corresponds to a molecular weight of about 1,000,000.

*Table 1*

| Weight of Monomer, g. | Volume of Methanol, cc. | Weight of Benzoyl Peroxide, g. | Temperature, degrees | Duration of Heating, h. | Yield, Percent | Intrinsic Viscosity |
|---|---|---|---|---|---|---|
| 10 | 30 | 0.1 | 60 | 4 | 32 | 193 |
| 10 | 55 | 0.1 | 60 | 4 | 15 | 168 |
| 10 | 100 | 0.1 | 60 | 4 | 4 | 142 |

It will be observed that the yield and molecular weight of the polymer are the higher as the solution is more concentrated. This serves as a valuable aid in manufacturing different products.

*Table 2*

| Weight of Monomer, g. | Volume of Ethanol, cc. | Weight of Benzoyl Peroxide, g. | Temperature, degrees | Duration of Heating, h. | Yield, Percent | Intrinsic Viscosity |
|---|---|---|---|---|---|---|
| 10 | 30 | 0.1 | 60 | 4 | 28 | 138 |
| 10 | 55 | 0.1 | 60 | 4 | 15 | 107 |

This indicates that the yield and degree of polymerization are higher in methanol than in ethanol.

*Table 3*

| Weight of Monomer, g. | Volume of Methanol, cc. | Weight of Benzoyl Peroxide, g. | Temperature, degrees | Duration of Heating, h. | Yield, Percent | Intrinsic Viscosity |
|---|---|---|---|---|---|---|
| 10 | 30 | 0.1 | 60 | 4 | 32 | 193 |
| 10 | 30 | 0.1 | 60 | 6 | 37 | 224 |

This shows that prolonging the heating increases the yield and the degree of polymerization.

The properties of polymerized maleic imide as an electrical insulator were put in evidence by means of a test in which the polymer obtained by polymerization in methanol was molded at a pressure of 5 metric tons per square centimeter and a temperature of 150° C. The resistivity of the resulting product was found to be $2.8 \cdot 10^{15}$ ohms/cm./cm.$^2$ at 22° C.

An advantage of the invention is the new class of resins of thermoplastic nature, white color, good electrical resistance, and exceptional heat resistance. Another advantage is the method of manufacture, easily variable to vary the properties of the product, and depending on reagents that are readily available and are readily removable from the product by a variety of means such as filtration and evaporation.

What is claimed is:

1. A homopolymer of maleic imide having a molecular weight of about 1,000,000.

2. A homopolymer of maleic imide having an intrinsic viscosity between about 107 and about 224.

3. A method of polymerizing maleic imide that comprises dissolving maleic imide in a saturated aliphatic alcohol of low molecular weight in the absence of other monomers and in the presence of a catalyst capable of supplying free radicals of the class consisting of oxygen and nitrogen.

4. A method of polymerizing maleic imide that comprises dissolving maleic imide in a saturated aliphatic alcohol of low molecular weight in the absence of other monomers, and heating the mixture to about 40–75° C. in the presence of a catalyst capable of supplying free radicals of the class consisting of oxygen and nitrogen.

5. A method of polymerizing maleic imide that comprises dissolving maleic imide in a saturated aliphatic alcohol of low molecular weight, having from 1 to 5 C atoms in the alkyl radical in the absence of other monomers and in the presence of a catalyst capable of supplying free radicals of the class consisting of oxygen and nitrogen.

6. A method of polymerizing maleic imide that comprises dissolving maleic imide in a saturated aliphatic alcohol of low molecular weight in the absence of copolymerizable substances and in the presence of about .5 to 2% by weight a catalyst capable of supplying free radicals of the class consisting of oxygen and nitrogen, at moderate and sustained temperature, separating the polymer from the polymerization medium and drying it.

7. A method of polymerizing maleic imide in the absence of copolymerizable materials that comprises dissolving maleic imide in a saturated aliphatic alcohol of low molecular weight, having from 1 to 5 C atoms in the alkyl radical in the presence of a catalyst capable of supplying free radicals of the class consisting of nitrogen and oxygen, and heating the mass at about 110° C.

8. The method of claim 4 in which the monomer is heated under less than atmospheric pressure.

9. The method of claim 4 in which the heating is under seal.

References Cited in the file of this patent

UNITED STATES PATENTS

| | | |
|---|---|---|
| 2,301,356 | Arnold et al. | Nov. 10, 1942 |
| 2,650,215 | Strain | Aug. 25, 1953 |
| 2,669,555 | Giammaria | Feb. 16, 1954 |

FOREIGN PATENTS

| | | |
|---|---|---|
| 571,463 | Great Britain | Aug. 27, 1945 |